United States Patent [19]
Wirtz

[11] Patent Number: 5,604,058
[45] Date of Patent: Feb. 18, 1997

[54] BATTERY GRIDS, METHOD AND APPARATUS

[75] Inventor: John O. Wirtz, Port Huron, Mich.

[73] Assignee: Wirtz Manufacturing Co., Inc., Port Huron, Mich.

[21] Appl. No.: 558,784

[22] Filed: Nov. 16, 1995

Related U.S. Application Data

[62] Division of Ser. No. 430,224, Apr. 28, 1995.

[51] Int. Cl.$^6$ .................................................. H01M 4/73
[52] U.S. Cl. .............................. 429/225; 429/241; 29/2
[58] Field of Search ........................................ 429/233, 241, 429/245, 225; 29/2, 623.5; 141/1.1, 32; 72/700

[56] References Cited

U.S. PATENT DOCUMENTS

| | | | |
|---|---|---|---|
| 3,051,030 | 8/1962 | Winkel | 27/2 X |
| 4,109,358 | 8/1978 | Duddy et al. | 27/2 |
| 4,415,016 | 11/1983 | McLane et al. | 164/429 |
| 4,469,145 | 9/1984 | Fletcher et al. | 141/1.1 |
| 4,509,581 | 4/1985 | McLane et al. | 164/479 |
| 4,534,404 | 8/1985 | McLane et al. | 164/429 |
| 4,543,863 | 10/1985 | Rader | 83/76 |
| 4,544,014 | 10/1985 | McLane et al. | 164/429 |
| 4,583,437 | 4/1986 | Rader et al. | 83/304 |
| 4,606,383 | 8/1986 | Yanik | 141/32 |

Primary Examiner—Anthony Skapars
Attorney, Agent, or Firm—Barnes, Kisselle, Raisch, Choaate, Whittemore & Hulbert

[57] ABSTRACT

A continuous cast positive grid of lead having substantially improved corrosion resistance and decreased growth in a positive plate of a lead-acid battery and a continuous cast negative grid of lead having substantially increased tensile strength for a lead-acid battery. A web of lead is continuously cast with a series of succeeding grid blanks of uniform thickness which are cold worked to reduce the positive grid thickness by at least 3:1 and the negative grid thickness in the range of about 1.5:1 to 2.8:1 preferably by passing through the nip of each of a plurality of successive compression rollers. Electro-chemically active paste is applied to the reduced webs, preferably flash dried, and individual pasted grids are cut from the reduced and pasted webs to provide positive plates and negative plates for a lead-acid battery. The reduced positive grids have a microstructure with substantially smaller grains and a more uniform grain structure and the reduced positive and negative grids have substantially increased tensile strength after full age hardening compared to as cast continuous grids after full age hardening.

35 Claims, 7 Drawing Sheets

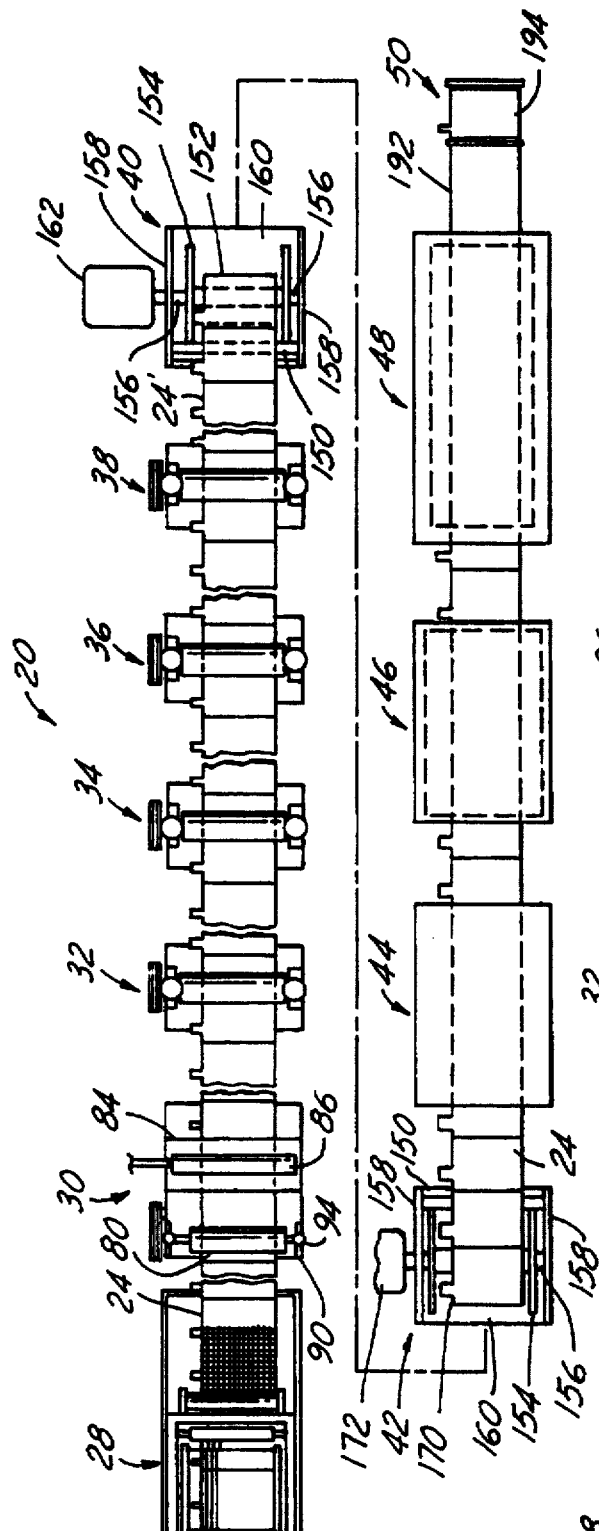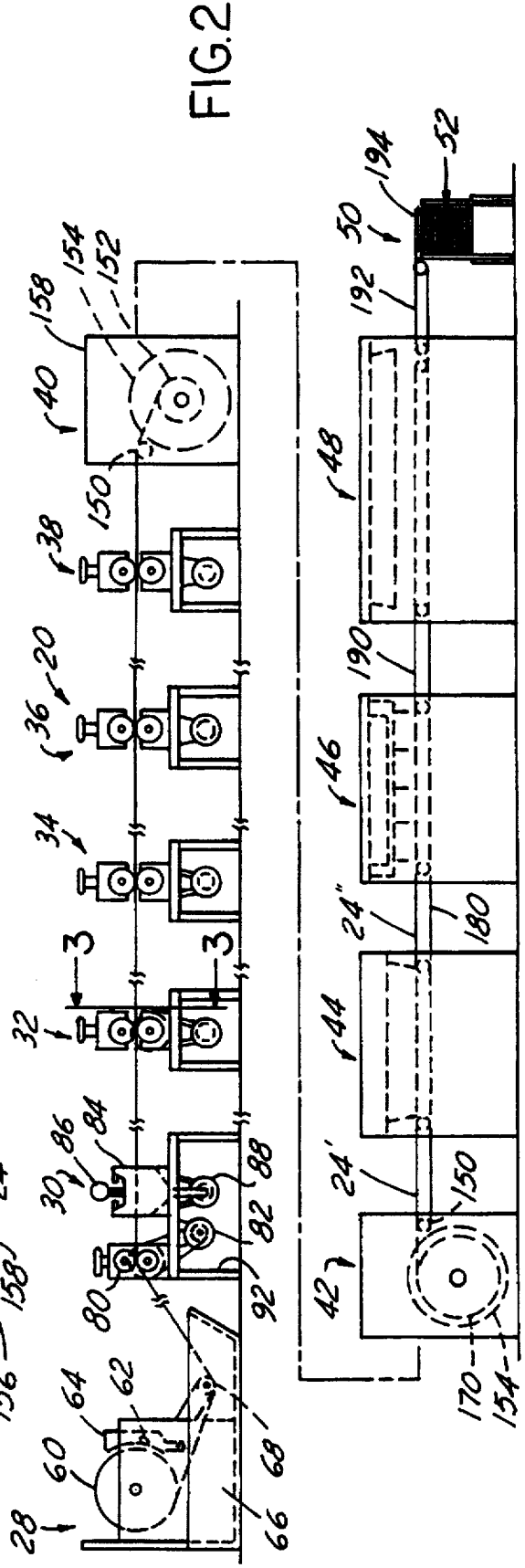

5,604,058

BATTERY GRIDS, METHOD AND APPARATUS

REFERENCE TO CO-PENDING APPLICATION

This is a divisional application of U.S. application Ser. No. 08/430,224, filed on Apr. 28, 1995.

FIELD OF THE INVENTION

This invention relates to lead-acid batteries and more particularly to cast grids for these batteries and a method and apparatus of making continuously cast grids.

BACKGROUND in use, in lead-acid batteries, the lead grids of the positive plates are subject to far more corrosion and growth than are the grids of the negative plates. In use, the lead in the positive plates corrodes or erodes away and disappears which decreases and eventually ends the useful life or life cycle of the battery. In use, the lead grids of the positive plates also grow and expand or elongate, particularly in length and height, on the order of 5% to 15% of their original length and height. This tends to cause the positive grid plates to pierce their separators or envelopes and short or ground out with an adjacent negative plate. This growth also tends to limit the design or pattern of the wires of the positive grids because diagonal wires are longer and hence have a greater absolute increase in length and hence a greater tendency to pierce a separator and short out.

Typically, lead battery grids may be made by (1) continuous casting of a web having a plurality of interconnected grids which are subsequently separated, (2) book molding or casting an individual grid or a panel of two grids in a mold usually of cast iron or steel which is water cooled or (3) by an expanded metal process. It has been found that compared to book molded and expanded metal grids, when continuous cast grids are utilized in positive plates, they are subject to greater growth and significantly increased corrosion which results in a useful life in service of about one-half to two-thirds of book molded and expanded metal grids as determined by SAE J-240 life cycle tests. Consequently, for many lead-acid battery applications, such as automotive batteries, continuously cast grids are unsatisfactory for positive battery plates or electrodes. Nevertheless, primarily due to reduced manufacturing and assembly costs, continuously cast lead grids are utilized in the negative plates or electrodes of many automotive batteries.

Therefore, various processes and equipment have been developed and commercially utilized for making continuously cast negative grids and battery plates. Typically, a plurality of grids are cast as a continuous strip or web of lead which may be washed to remove molding compounds and lubricants and is usually coiled for inspection and storage before further processing. Subsequently, the web is uncoiled, passed through a continuous pasting machine, cut into individual pasted grids or plates which are passed through a drying oven to remove excess moisture from the paste, and then stacked in piles of individual plates by a stacker for subsequent processing and assembly as negative plates in lead acid batteries. Suitable continuous casting machines are disclosed in U.S. Pat. Nos. 4,509,381; 4,415,016; 4,534,404; and 4,544,014. A suitable paster is disclosed in U.S. Pat. No. 4,606,383, suitable cutting devices are disclosed in U.S. Pat. Nos. 4,543,863 and 4,583,437, and a suitable stacker is disclosed in U.S. Pat. No. 4,973,218.

SUMMARY OF THE INVENTION

A battery positive grid is continuously cast of lead and thereafter reduced in cross sectional thickness and elongated to change the microstructure of the lead and provide enhanced corrosion resistance and other properties needed for positive grids. The as cast thickness of the positive grids is reduced by at least ½ or 2 to 1, preferably about ¾ or 4 to 1, and may be reduced about ⅞ or 8 to 1 to produce the desired microstructure of relatively small and relatively uniform size compared to the as continuous cast microstructure, and other desirable properties, including increased tensile strength after age hardening of the lead. A battery negative grid is continuously cast of lead and thereafter reduced in cross sectional thickness and elongated to increase the ultimate tensile strength needed for a lighter negative grid. The as cast thickness of the negative grids is reduced in the range of about 1.5:1 to 2.8:1 to produce the desired properties for negative grids after age hardening.

Preferably, the positive and negative grids are made by continuous casting an elongate web of a plurality of either positive or negative grids, preferably washing the web to remove molding compounds, and then passing the web through the nip of one or more pairs of compression rollers to reduce the thickness of the web. The thickness of the web is usually reduced within 24 hours, desirably within 12 hours, preferably within 4 hours and more preferably right after being continuously cast and washed or cleaned. This reduction in thickness also significantly increases the length of the web and grid wires extending parallel to the direction of travel of the web through the rollers and substantially increases the width of the grid wires extending transversely to the direction of travel of the web through the rollers. After the reduction is completed, the web is pasted, preferably cut into wet pasted grids or plates, dried to remove moisture and at least begin curing the paste, preferably at an elevated temperature in a drying oven, and usually stacked in piles for subsequent assembly as positive and negative plates or electrodes of a lead acid battery.

Objects, features and advantages of this invention are to provide continuously cast battery positive grids which have greatly improved corrosion resistance and significantly reduced growth in use, and to provide continuously cast positive and negative grids which have substantially increased tensile strength, a longer in service useful life, fewer short outs and premature failures, require less lead, can be readily produced with a wide variety of wire configurations, have improved tolerances and dimensional control, are produced with less scrap, improved quality, and at higher production rates, can be easily produced by automated manufacturing processes and equipment, and are stable, rugged, durable, reliable and of relatively simple design, economical manufacture and assembly.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

These and other objects, features and advantages of this invention will be apparent from the following detailed description of the preferred embodiment and best mode, appended claims and accompanying drawings in which:

FIG. 1 is a plan view of a production line for making positive or negative grids and plates of this invention by the method of this invention;

FIG. 2 is a side view of the production line of FIG. 1;

DETAILED DESCRIPTION

Figure 3:
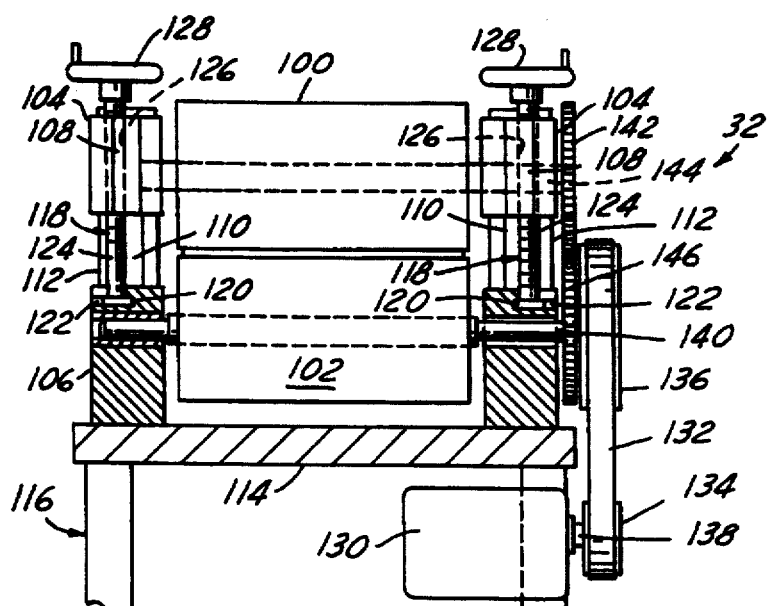
FIG. 3 is a fragmentary sectional view taken generally on line 3—3 of FIG. 2 and illustrating one of the compression roller stands of the production line.

FIGS. 1 and 2 illustrate a production line 20 for utilizing the method of this invention to make battery positive grids 22 (FIG. 7) and negative grids 422 (FIG. 13), and battery plates or electrodes of this invention. In the production line, a web 24 of a plurality of interconnected successive grid blanks 26 (FIG. 4) is continuously cast from a molten lead composition by a continuous casting machine 28, and cleaned to remove molding compounds in a washing machine 30. The moving web 24 is reduced in cross section and elongated in the direction of travel by a series of compression roller machines 32, 34, 36 & 38 and wound on a drum or reel in a coiling machine 40 for inspection, handling and any storage before further processing. The web is unwound from the reel in an uncoiling machine 42, passes through a continuous pasting machine 44, which applies battery paste to the web and a cutting machine 46 which cuts individual pasted grids or plates from the web. The individual pasted plates pass in succession through a drying oven 48 which removes moisture from the paste and through a stacking machine 50 which deposits the individual plates in piles or stacks 52 which are removed for any further processing and assembly into a lead-acid battery as plates or electrodes of the battery.

Casting Machine

The casting machine 28 casts the web 24 of lead with a plurality of successive grid blanks 26 in a continuous manner. In the machine 28, molten lead is supplied to a mold cavity in a rotating cylindrical drum 60 under superatmospheric pressure through an orifice slot 62 in a shoe 64 with an arcuate segment bearing on the peripheral surface of the drum. A grid pattern is machined in the peripheral surface of the drum 60 to form a mold cavity in which the lead rapidly solidifies as it is advanced beyond the orifice slot 62 which opens onto the drum. The solidified web 24 is stripped from the rotating drum and preferably passed through a water bath 66 to rapidly quench and cool it and under a guide roller 68. Typically, the web is continuously cast at a rate of about 50 to 200 lineal feet per minute. Suitable continuous casting machines are disclosed in U.S. Pat. Nos. 4,415,016; 4,509,581; 4,534,404 and 4,544,014, the disclosures of which are incorporated herein by reference and hence will not be described in further detail.

Washer

In the washer 30, the moving web passes through the nip of a pair of rollers 80 corotated at the same surface speed by an electric motor 82 and passes generally horizontally through a spray enclosure 84. To wash molding compounds, lubricants and the like from the web 24, water or a cleaning solution is discharged under pressure from a spray head 86 onto the web as it passes through the booth. Typically, the water or cleaning solution is collected in the bottom of the booth, filtered or processed to remove contaminants, and then recirculated through the spray head 86 by a suitable pump 88. The rollers 80 are journalled for rotation by bearings received in a carrier stand 90 received on a support frame 92 and typically have a mechanism 94 for adjusting the height of the nip or minimum gap between the rollers so that they firmly frictionally engage the web to drive or advance it.

Roller Stands

In accordance with the method of this invention, the cross sectional thickness of the web 24 is reduced and the web is elongated in its direction of travel in each of the succeeding roller stands 32, 34, 36 and 38. Since each of the roller stands has essentially the same construction and arrangement, only the first roller stand 32 will be described in detail.

As shown in FIGS. 2 & 3, each stand has a pair of compression rollers 100 and 102 journalled for rotation in bearings received in carrier blocks 104 and 106 with gibs 108 slidably received in ways or grooves 110 in upstanding end plates 112 fixed to a mounting plate 114 on a frame 116 of the stand. The nip or minimum vertical clearance between the rollers can be adjusted by a jack screw 118 with a head 120 received in a recess or slot 122 in the bearing block 106 and a threaded shank 124 received in a complementarily threaded bore 126 through the bearing block 104. A hand wheel 128 is fixed to the other end of the jack screw for manually rotating it. To drive the web through the nip of the rollers, the lower roller 102 is driven by an electric motor 130 through a timing belt 132 and complementary cog pullies 134 and 136 mounted on the motor drive shaft 138 and the roller shaft 140. The upper roller 100 is driven by a gear 142 mounted on a roller shaft 144 which is driven by a complimentary gear 146 mounted on the roller shaft 140. Preferably, the motor 130 is a variable speed electric motor to facilitate driving the lower roller 102 at the proper peripheral surface speed to feed the web 24 through the nip of the compression rollers. This surface speed differs for each stand 32–38 because each time the web is reduced in thickness, it is elongated in the direction of travel of the web thereby requiring that the rollers be driven at a higher peripheral surface speed in each succeeding stand. In each stand, the rollers 100 and 102 are driven at a constant peripheral surface speed substantially equal to the speed of the web as it enters the stand. The upper roller 100 is driven by the lower roller 102 thru the pair of gears 142 and 146.

Coiler

As shown in FIGS. 1 and 2, after the moving web emerges from the last roller stand 38, it enters a coiler machine 40. The reduced web 24' passes over a guide roller 150 and is wound in a coil on a reel 154 received on a pair of arbors 156 carried by a pair of upright end plates 158 fixed to the base 160 of the coiler machine. The reel 154 is rotated by a variable speed electric motor 162 at a rotary speed which decreases as the diameter of the coil 152 increases to take up the reduced web 24' as it emerges from the last roller stand 38.

Uncoiler

The uncoiling machine 42 has essentially the same construction as the coiler 40 with a coil 170 of a reduced web 24' wound on a reel 154 which is received on arbors 156 in the unwinder. To feed the web 24' to the paster 44, the reel is rotated to unwind the coil 170 by a variable speed motor 172. To supply the web 24' to the paster 44 at a substantially constant lineal surface speed, the motor 172 increases the speed at which the reel is rotated as the coil 170 unwinds and hence its diameter decreases.

Typically, a web coiler 40 and uncoiler 42 are used in the production line so that the casting, washing and rolling steps can be carried out independently of the pasting, cutting, drying and stacking steps. This provides greater flexibility in production operations and readily accommodates the differential between the lineal speed at which the reduced web 24' emerges from the last roller stand 38 (100 to 250 lineal feet per minute) relative to the much slower speed at which it is supplied to the pasting machine (typically 50–200 lineal feet per minute). This also permits inspection, storage, and, if desired, age hardening of the reduced web 24' before it is further processed. This also permits either portion of the line to be repaired or serviced while the other portion is in production and either portion to be idle when it is not needed for production.

Pasting Machine

An electro-chemically active paste is applied to the reduced web 24' as it passes through the pasting machine 44. All of the interstices or open spaces between the wires of the web are filled with the paste, and preferably the web is "over pasted" so that the wires are completely embedded in and surrounded by the paste and the paste extends outwardly from both the top and bottom faces of the web and has a thickness greater than the thickness of the web. Typically, the paster applies a strip of paper to both the top and bottom exposed faces of the paste which prevents the paste from sticking to the equipment and facilitates downstream handling and processing of the pasted web 24". A suitable machine for continuously pasting the web is disclosed in U.S. Pat. No. 4,606,383, the disclosure of which is incorporated herein by reference and hence the paster 44 will not be described in greater detail.

Cutting Machine

The pasted web 24" is advanced by a powered belt conveyor 180 into the cutting machine 46 which cuts or severs the pasted web 24" into individual pasted plates. The cutter has appropriate synchronizing circuitry so that the web is cut through the center of a double width transversely extending frame wire to produce, as shown FIG. 7, the trailing frame wire 182 of the grid 22 of one pasted plate and the leading frame wire 184 of the grid 22 of the immediately succeeding pasted grid.

A suitable machine for cutting a continuous web into successive individual battery plates and suitable synchronizing circuitry are disclosed in U.S. Pat. Nos. 4,583,437 and 4,543,863, the disclosures of which are incorporated herein by reference and hence will not be described in greater detail.

Drying Oven

The individual pasted plates 22 are received on a belt conveyor 190 which moves them through the flash drying oven 48. Preferably, to provide a gap or space between succeeding adjacent plates 22 to thereby decrease the risk of collision and damage of the plates, the conveyor 190 is driven at a greater lineal speed than the lineal speed of the individual plates 22 emerging from the cutting machine 46.

To facilitate further handling and processing of the pasted plates, preferably, oven 48 merely dries or removes moisture from the outer layer or skin of the faces of the paste which temporarily strengthens and solidifies the skins while the central portion of the paste remains relatively soft and pliable and retains substantial moisture. For many processing applications, this flash drying is not absolutely necessary and hence for such applications, this oven is optional. Typically, this is a direct flame gas fired convection oven which may be of conventional construction and hence will not be described in further detail.

Stacker

The individual plates emerging from the oven 48 are advanced by an entry conveyor 192 into the stacker mechanism 50. In the stacker, a stream of successive individual pasted positive plates 194 moving at a high rate of speed are continuously piled in stacks 52 each having a plurality of superimposed plates. The stacks of plates are removed and subsequently assembled as positive plates or electrodes in lead-acid batteries. A suitable battery plate stacker is disclosed in U.S. Pat. No. 4,973,218, the disclosure of which is incorporated herein by reference and hence the stacker 50 will not be described in greater detail.

Positive Grids

In accordance with this invention, the desired properties of continuously cast positive grids are achieved when the thickness of the as cast web 24 is reduced at least 70% or about 3½ to 1 and preferably about 75% or 4 to 1. Somewhat lesser but still satisfactory properties are achieved when the thickness is reduced up to about 90% or 10 to 1. To achieve the most satisfactory results, the final thickness of continuously cast positive grids after reduction is desirably not greater than 0.022 of an inch and preferably not greater than 0.020 of an inch. A significant savings of both lead and paste is realized by using the significantly thinner positive grids. When the as cast thickness is reduced by passing the web through the nip of compressing rollers, there is a decided tendency for the rollers to slip so that the web is not fed at a uniform or substantially constant speed if the attempted reduction in thickness is greater than about 45% to 50%. To avoid roller slipping, preferably the maximum reduction in thickness is not greater than about 35% for each pass through one pair of rollers. Therefore, to achieve an overall reduction ratio of about 4 to 1, it is preferable to reduce the as cast web in at least four passes and preferably through four successive pairs of rollers. For example, if a continuous cast web as cast has a thickness of 0.080 of an inch and is reduced 4 to 1 to a final thickness of 0.020 of an inch, the first and second reductions can be 0.020 of an inch each and the third and fourth reductions 0.010 of an inch each. These four reductions can be accomplished by passing the web through the successive roller stands 32, 34, 36 & 38 to reduce the web thickness respectively to 0.060, 0.040, 0.030 and 0.020 of an inch.

With each reduction in thickness, the length of the web increases in the direction of rolling or longitudinally of the web. With a reduction in thickness of 4 to 1, the overall length of the web increases about 2 to 1 to 2.5 to 1 in the direction of rolling. Rolling to reduce the thickness of the web has little affect on its transverse width which usually increases less than 1%. Aging of as cast webs before rolling has an affect on the ratio and particularly the uniformity of the increase in length of the webs when they are being rolled to reduce their thickness. The increase in length is larger and significantly more variable if as cast webs are aged for more than 36 hours before rolling. Normally, an as cast web should be rolled to reduce its thickness within 24 hours after continuous casting, desirably within 4 hours after continuous casting, preferably within 30 minutes after continuous casting, and most preferably within 15 minutes after continuous casting.

All reductions in thickness of the web should be carried out under cold working conditions with the peak metal temperature being in the range of 35° F. to 180° F., and preferably 50° F. to 80° F. Suitable rollers for reducing the web thickness may have a diameter of at least 2.5 inches and be made of hardened and ground tool steel with a surface finish of about 15–20 micro inches and a peripheral surface hardness of about 64–65 Rockwell on the C Scale.

Figure 10:
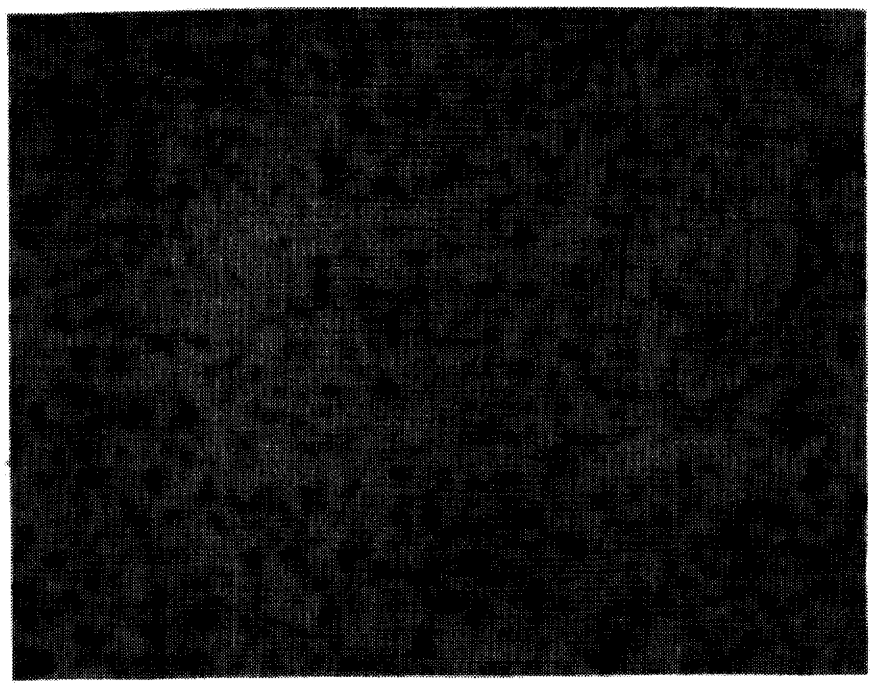
FIG. 10 is a photograph of the microstructure of a conventional prior art continuous cast lead battery positive grid.
Figure 11:
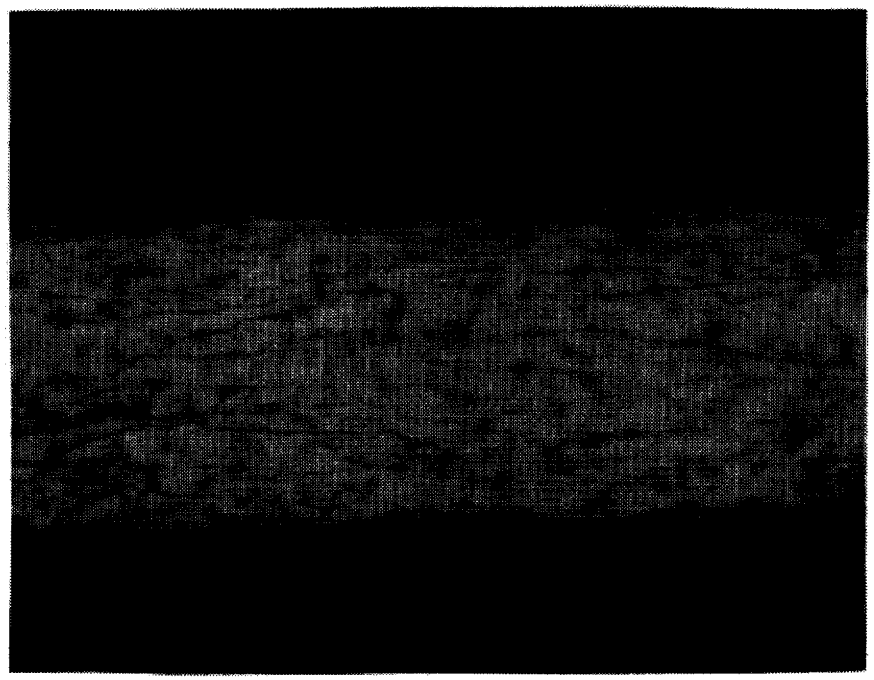
FIG. 11 is a photograph of the microstructure of a continuous cast lead battery positive grid of this invention made by the method of this invention.

The continuously cast and rolled positive grids may be made from a lead alloy containing about 0.06% to 0.07% calcium and about 1.3% to 1.7% tin. As continuously cast, and before any reduction in thickness, webs and grids of this lead alloy have a large, random and non-uniform grain microstructure as shown in FIG. 10, a tensile strength of about 6,000 to 6,500 psi after age hardening for 30 days at room temperature, and relatively poor corrosion resistance and significant growth in use as grids of positive plates in a lead acid battery. In contrast, continuously cast webs and grids which were reduced in thickness by 80% or a ratio 4 to 1 by cold working utilizing the process of this invention have a microstructure with much smaller and more uniform grains which appear to be oriented and aligned essentially parallel to the direction of deformation and travel of the web during rolling as shown in FIG. 11. These webs and grids of this alloy as produced by this process have greatly increased tensile strength of about 10,300 to 11,000 psi after full age hardening and greatly improved corrosion resistance and reduced growth in use as grids of positive plates in a lead-acid battery. Webs and grids of this lead alloy as produced by this process also have maximum rupture strength after full age hardening at room temperature which is dramatically greater than the rupture strength of webs and grids of this alloy as continuously cast and aged for at least 30 days at room temperature.

Figure 4:
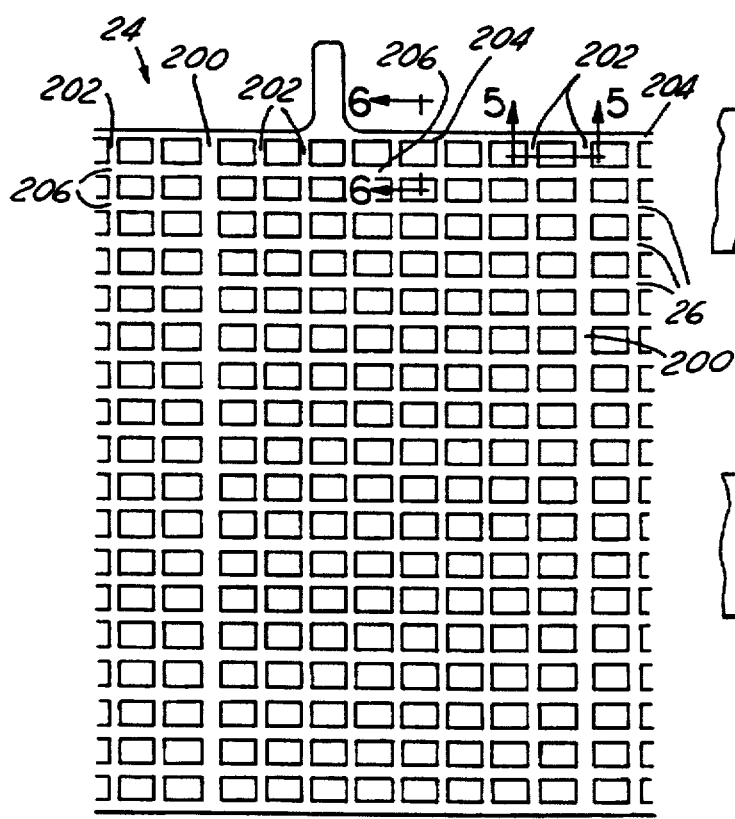
FIG. 4 is a fragmentary plan view of a web of positive grid blanks as continuously cast by the production line.
Figure 5:
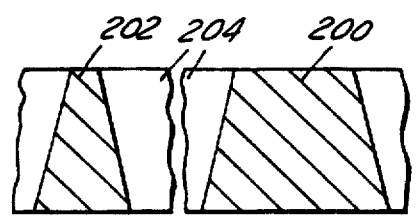
FIG. 5 is a sectional view taken generally on line 5—5 of FIG. 4 and illustrating the cross sectional configuration of a grid wire and a frame wire extending transversely of the web.
Figure 6:
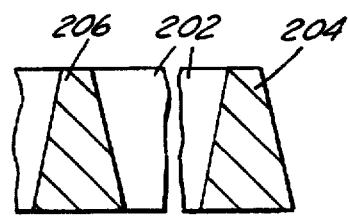
FIG. 6 is a fragmentary sectional view of a positive grid wire and frame wire extending longitudinally of the web.
Figure 7:
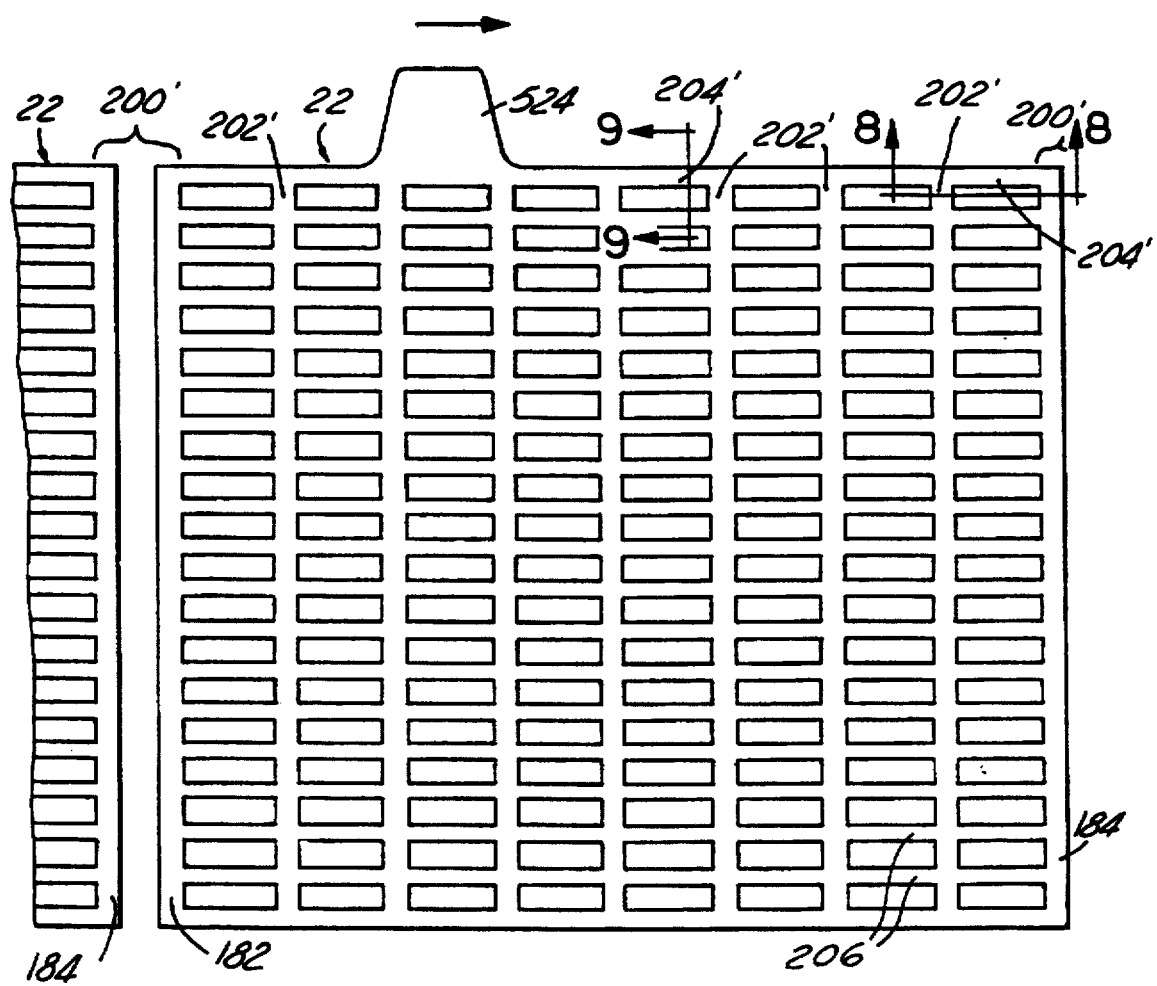
FIG. 7 is a plan view of a positive grid after its grid blank has been reduced in thickness and extended in the longitudinal direction of the web by rolling and after being cut from the web and for purposes of illustration shown without any paste applied thereto.
Figure 8:
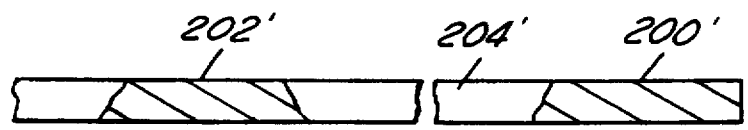
FIG. 8 is a fragmentary sectional view taken generally on line 8—8 of FIG. 7 and showing in cross section a transverse frame wire and a grid wire of the positive grid.
Figure 9:
FIG. 9 is a fragmentary sectional view taken generally on line 9—9 of FIG. 7 and showing in cross section a longitudinal frame wire and a grid wire of the positive grid.

As may be seen by a comparison of FIGS. 4 & 7, when an as continuous cast grid blank 26 of a web 24 of this lead alloy with a thickness of 0.080 of an inch was reduced in thickness 4:1 to 0.020 of an inch in accordance with this process, it was elongated 2.2:1 in the longitudinal direction of rolling with virtually no change in overall width. As shown by a comparison of FIGS. 5 & 8, in cross-section the average width of the transverse frame wire 200, 200' and transverse internal wires 202, 202' increased about 2.53:1 and the cross-sectional area was essentially unchanged. In FIG. 5, the entire cross-section of the transverse frame wire 200 of two adjacent grid blanks 26 is shown while in FIG. 8 only half of this transverse wire section is shown since the frame wire 200' was cut in half along its axis when the grid 22 was cut from the web 24" to form one leading frame wire 184 and one trailing frame wire 182 from the web wire 200'. As shown by a comparison of FIGS. 6 & 9, in cross-section the average width of the longitudinal frame wire 204, 204' and internal longitudinal wires 206, 206' increased about 1.45:1 with a reduction in cross-sectional area about 0.57:1.

Negative Grids

The production of continuously cast negative grids according to this invention is achieved utilizing essentially the same process as described for making positive grids with the exception of the differences described below. The desired properties of continuously cast negative grids are achieved when the thickness of the as cast web 24 is reduced at least 50% or about 2:1 and preferably about 60% or 2.5:1. Though the microstructure grains begin to align, satisfactory results occur until reduction of the as cast web approaches 66% or 3:1. When the as cast web thickness is reduced by more than about 3:1, the grain size of the lead starts to decrease, the density of the as cast lead material is increased and the ultimate tensile strength is reduced. The increased density is not desirable for the negative grids since the primary benefit of reducing the thickness of the as cast web for use in negative battery plates is to achieve a stronger cold worked grid with a higher tensile strength permitting a thinner, and hence, a lighter weight negative grid while still maintaining sufficient strength and stiffness to permit subsequent handling, pasting, processing and assembly into lead-acid batteries. The final thickness of continuously cast negative grids after reduction is desirably not greater than 0.022 of an inch, preferably not greater than 0.020 of an inch, and in many applications most preferably about 0.010 of an inch. A significant savings of both lead and paste is realized by using the significantly thinner negative grids.

As with the positive grid process, preferably the maximum reduction in thickness through any pair of rollers is not greater than about 35%. Therefore, to achieve an overall reduction ratio of about 2.5:1 or about 60%, it is preferable to reduce the as cast web in at least two passes and preferably through at least two successive pairs of rollers. For example, if a continuous web as cast has a thickness of 0.025 of an inch and is reduced 2.5:1 to a final thickness of 0.010 of an inch, the first reduction is preferably about 0.009 of an inch and the second reduction is about 0.006 of an inch for a desired total reduction of 0.015 of an inch resulting in the final thickness of 0.010 of an inch.

As with the positive grid process, the length of the web increases in the direction of rolling of the web for each reduction in thickness. For the negative grids with a reduction of about 2.5:1, the length of the web increases about 1.55 to 1 in the direction of rolling. Hence, the length and thickness of the as cast negative grid blanks of the web will be different than for the as cast positive grid blanks of the web such that the post process negative grids will have substantially the same overall length and width as the post process positive grids.

Aging of the as cast web before rolling has an effect on the ratio and particularly the uniformity of the increase in length of the webs. Hence, it is desirable that the negative as cast web be rolled to reduce its thickness within 24 hours after continuous casting and most preferably within 15 minutes after continuous casting. The temperature range for the cold working process for the negative web should also be in the same range as for the positive web and preferably about 50° F. to 80° F.

Since negative plates in a lead-acid battery are exposed to minimal corrosion, enhancing the corrosion characteristics of the negative grids is unnecessary and essentially irrelevant. Changing the alloy microstructure is therefore not necessary. Also, as the microstructure of the lead alloy changes during the cold working process, the density of the lead material starts to increase and beyond a reduction ratio of 3.5:1 the ultimate tensile strength decreases. An increase in material density is highly undesirable for the negative grids because the primary benefit of reducing the thickness of the as cast web is to increase the tensile strength of the material permitting a thinner and hence a lighter negative battery grid.

A cold worked as cast web having a 2:1 reduced thickness provides a negative grid of equivalent strength, stiffness and durability and about 20% to 25% lighter, and also thinner than a negative grid that is simply continuous cast and age hardened for at least 30 days. A 2.5:1 thickness reduction provides an equivalent negative grid about 25% to 30% lighter, and also thinner than simply a continuous cast and age hardened negative grid. By cold working the as cast negative web, the tensile strength improvement provides a thinner and lighter negative grid to produce a negative battery plate which is less expensive than simply a continuous cast negative grid and hence a cost savings in both lead and battery paste.

The continuously cast and rolled negative grids may be made from a lead alloy similar to the material used to produce the positive grids according to this invention. For the negative grids however, the process yields an ultimate tensile strength of about 10,250 to 10,600 psi after full age hardening at room temperature. Webs and grids of this lead alloy as produced by this process for negative grids also have maximum rupture strength after full age hardening at room temperature. This is dramatically greater than the rupture strength of webs and grids of this alloy merely continuously cast and aged for 30 days at room temperature.

Figure 12:
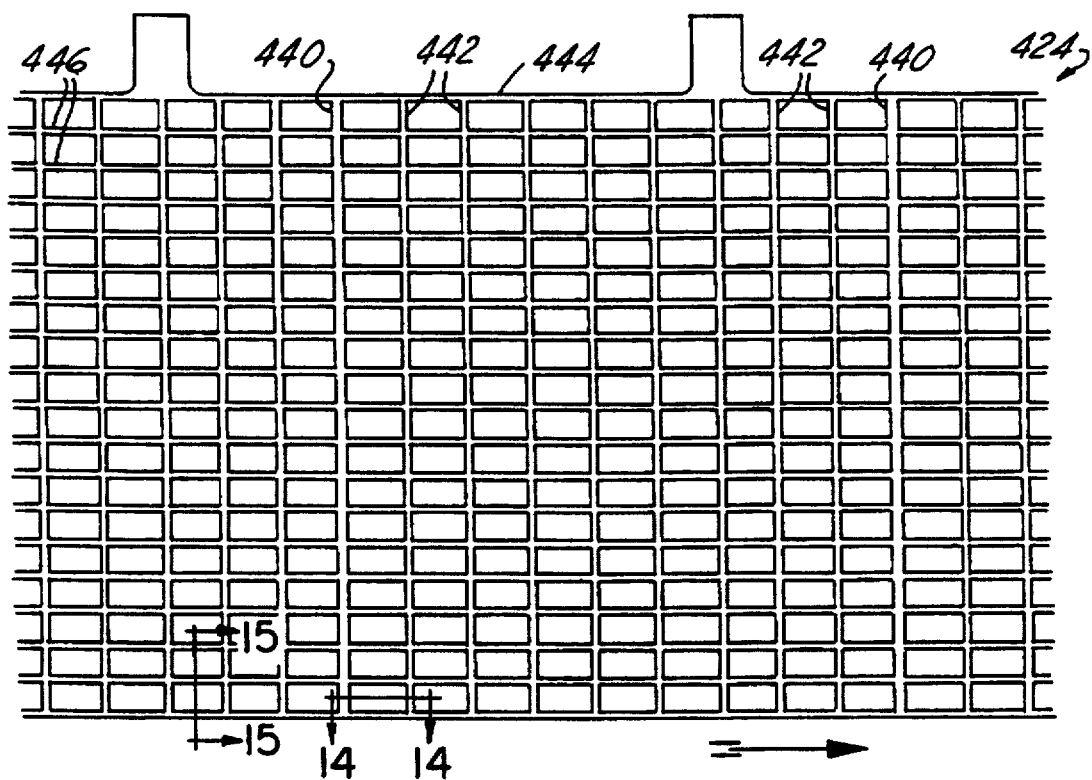
FIG. 12 is a fragmentary plan view of a web of negative grid blanks as continuously cast by the production line.
Figure 13:
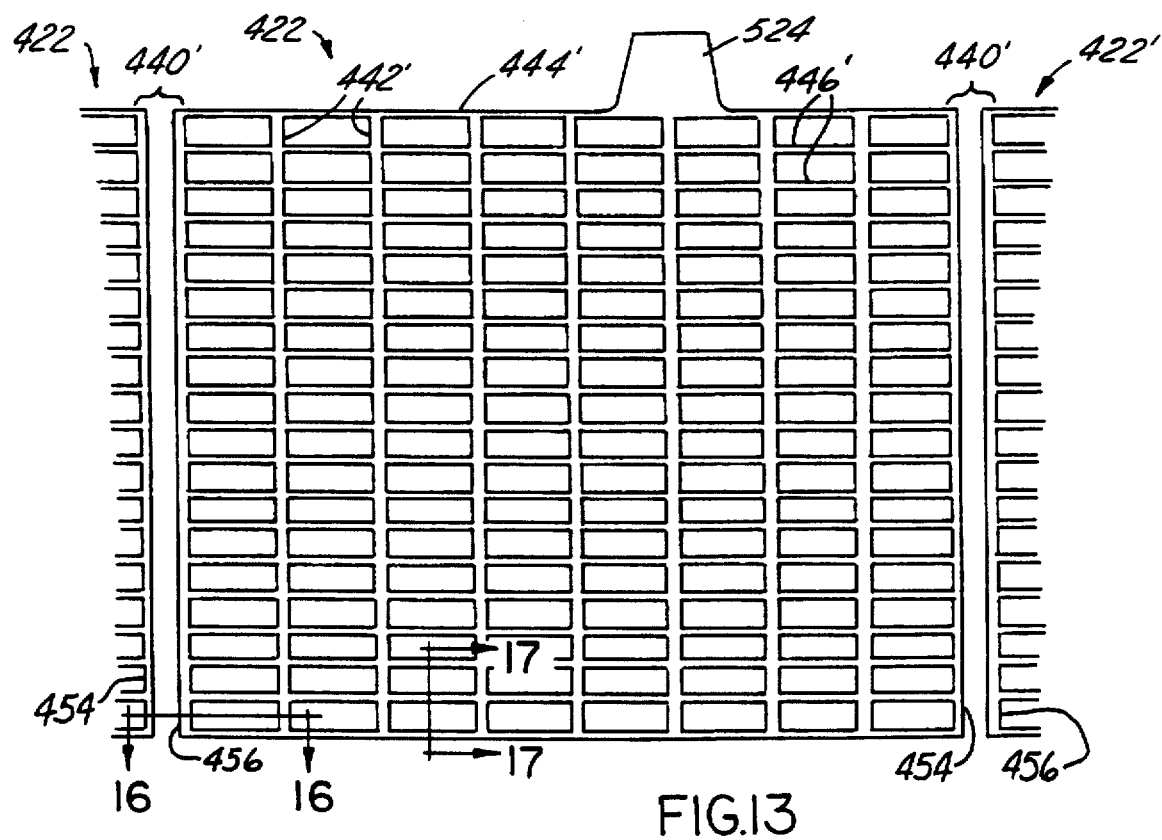
FIG. 13 is a plan view of a negative grid after its grid blank has been reduced in thickness and extended in the longitudinal direction of the web by rolling and after being cut from the web and for purposes of illustration shown without any paste applied thereto.
Figure 14:
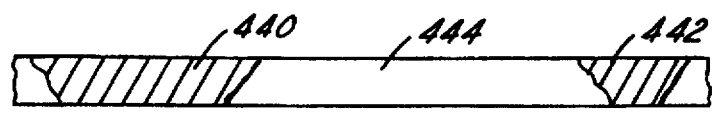
FIG. 14 is a sectional view taken generally on line 14—14 of FIG. 12 and illustrating the cross sectional configuration of a grid wire and a frame wire extending transversly of the web.
Figure 15:
FIG. 15 is a fragmentary sectional view taken along line 15—15 of FIG. 12 and showing a grid wire and a frame wire extending longitudinally of the web.
Figure 16:
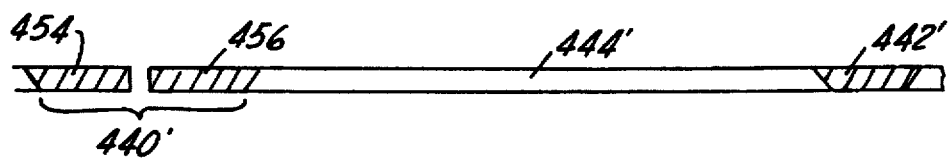
FIG. 16 is a fragmentary sectional view taken along line 16—16 of FIG. 13 and showing in cross section a transverse frame wire and a grid wire of the negative grid.
Figure 17:
FIG. 17 is a fragmentary sectional view taken along line 17—17 of FIG. 13 and showing in cross section a longitudinal frame wire and a grid wire of the negative grid.

As may be seen by a comparison of FIGS. 12 & 13, when an as continuous cast negative grid blank 426 of a web 424 of this lead alloy with a thickness of 0.040 of an inch was reduced 2.2:1 to about 0.018 of an inch in accordance with this process, the web was elongated 1.4:1 in the longitudinal direction of rolling with virtually no change in overall width. As shown by a comparison of FIGS. 14 & 16, in cross-section the average width of the transverse frame wire 440, 440' and transverse internal wires 442, 442' increased about 1.85:1 and the cross-sectional area increased about 1.24:1. As shown in FIG. 14, the entire cross-section of the transverse frame wire 440 of two adjacent negative grid blanks 426 is shown while in FIG. 16 only half of this transverse wire section is shown since the frame wire 440' was cut in half along its axis when the grid 422 was cut from the web 424 to form one leading frame wire 454 and one trailing frame wire 456 from the web wire 440'. As shown by a comparison of FIGS. 15 & 17, in cross-section the average width of the longitudinal frame wire 444, 444' and internal longitudinal wires 446, 446' increased about 1.55:1 and in cross-sectional area about 1.04:1.

Figure 18:
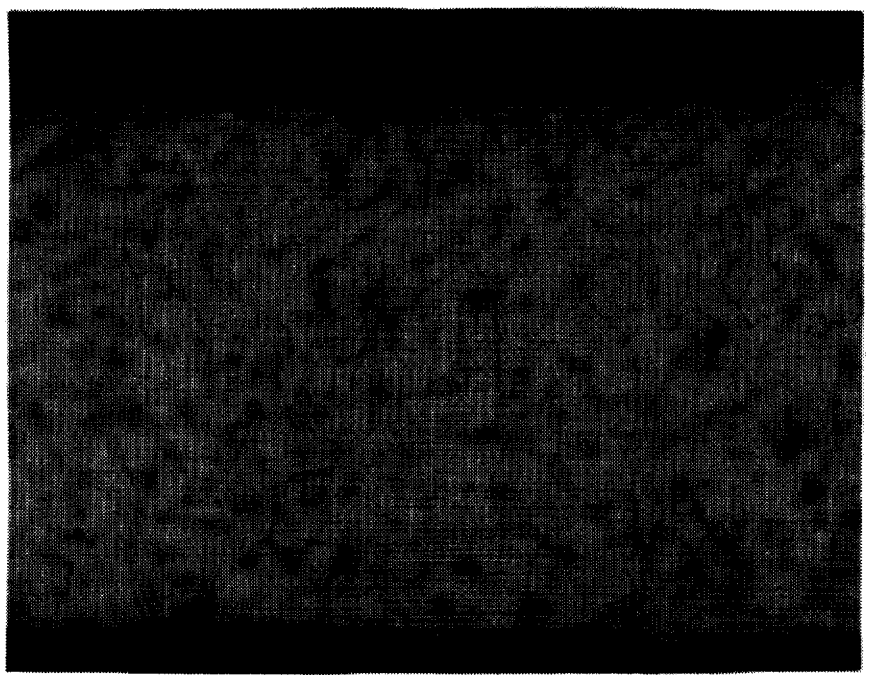
FIG. 18 is a photograph of the microstructure of a conventional prior art continuous cast lead battery negative grid.
Figure 19:
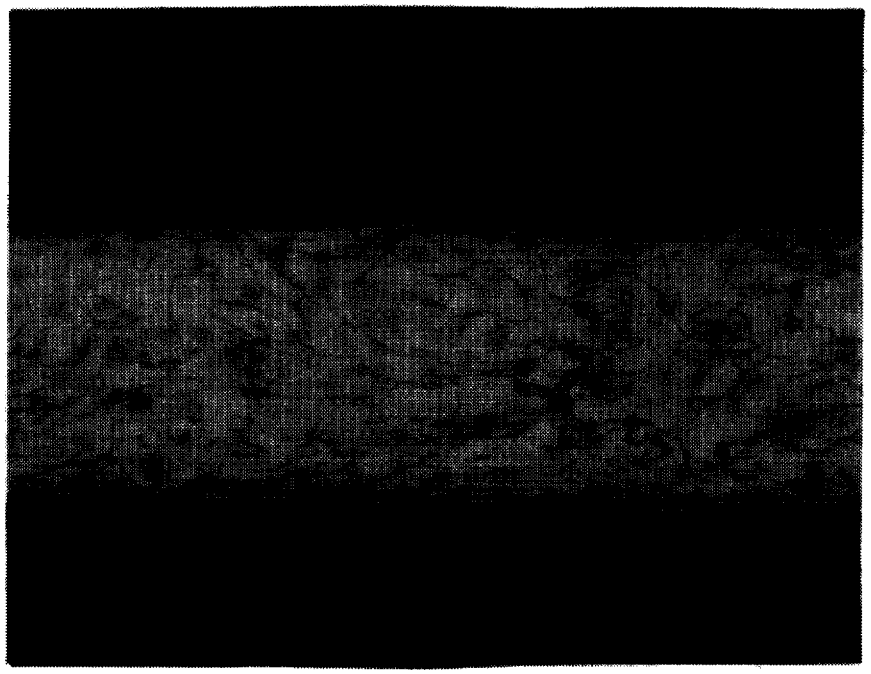
FIG. 19 is a photograph of the microstructure of a continuous cast lead battery positive grid of this invention made by the method of this invention.

As shown by a comparison of FIGS. 18 & 19, there is no significant microstructure grain size change between a typical as cast negative grid blank and a cold worked negative grid blank of this invention having a 2:1 reduced thickness of its as cast blank and the grains begin turning toward alignment with the direction of rolling.

Lead-Acid Battery

Figure 20:
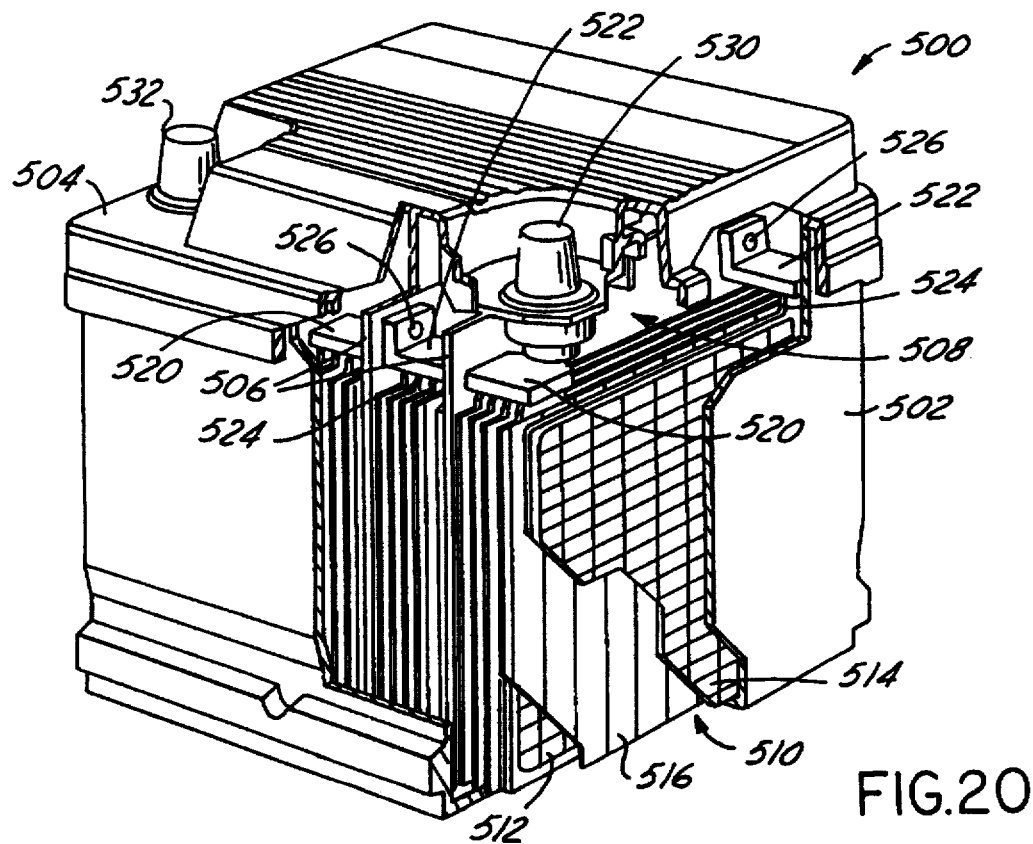
FIG. 20 is a fragmentary sectional view of a lead-acid battery assembled with grids of this invention made by the method of this invention.

A lead-acid battery 500 embodying the grids and plates of this invention is shown in FIG. 20. The battery 500 has an outer rectangular case 502 and a top cover 504 constructed from a material such as polypropylene. Within the case are a number of integrally molded battery cell dividers 506 defining a number of separate battery cell wells 508. The outer case construction herein described is merely for illustrative purposes and may take on a number of configurations and constructions without departing from the scope and spirit of the invention.

A battery cell 510 is disposed within each of the wells 508 between the cell dividers 506 within the case 502. A battery cell 510 has a set of positive plates 512 constructed as previously described and a set of negative plates 514 also constructed as previously described. The battery plates 512, 514 of the cell are assembled in a plate book positioned in an alternating sequence of positive and negative plates. A separator 516 constructed from a microporous electrically insulating material is disposed between each positive and negative plate for preventing plates of different polarity from touching, thereby preventing a short circuit within any particular cell 510 of the battery 500. The separator 516 sometimes takes the form of an envelope, as shown, into which each positive plate 512 or negative plate 514 is placed.

As shown in FIG. 20, a pair of lead plate straps 520, 522 each connecting the plates of like polarity within a book by connecting the tabs 524 (see FIGS. 7 & 13) formed on the top portion of each plate. Hence, each cell 510 has a positive strap 520 and a negative strap 522 disposed on top of the plate book. To connect the individual cells together in series an intercell connector 526 made of lead is disposed between each cell 510 for connecting the positive plate straps 520 and negative plate straps 522 of adjoining cells in series. The positive strap 520 of the first cell is connected to a positive lead battery post 530 and the negative strap 522 of the last cell is connected to negative lead battery post 532, respectively, forming the positive and negative lead-acid battery terminals. A dilute sulfuric acid solution fills a majority of the remaining space to the desired level within each well 508 and is the electrolyte necessary to produce the chemical reactions which take place within each battery cell 510.

A typical battery such as an automotive type battery has six of such cells each producing a potential of about two volts of electrical energy thereby forming a typical 12 volt battery as depicted in FIG. 20. A battery having plates constructed according to this invention is lighter in weight than prior art batteries and has improved battery life in that the positive plates have improved corrosion resistance.

What is claimed is:

1. A positive grid for a positive plate of a lead-acid battery comprising a grid continuous cast of molten lead as part of a web and having a substantially uniform thickness and a plurality of interconnected wires with interstices between them, and the grid being cold worked to reduce the thickness of the as cast grid by at least 3:1 to provide a continuous cast positive grid for a positive plate of a lead-acid battery having substantially increased corrosion resistance and increased tensile strength after age hardening for 30 days.

2. The positive grid as defined in claim 1 wherein the cold worked and reduced thickness positive grid has a micro-structure with a substantially smaller grain size and a more uniform grain structure than that of the as cast continuous grid of the web.

3. The positive grid as defined in claim 1 wherein the thickness of the as cast grid is reduced in the range of 3½:1 to 10:1.

4. The positive grid as defined in claim 1 wherein the thickness of the as cast grid is reduced in the range of 3½:1 to 5:1.

5. The positive grid as defined in claim 1 which also comprises the grid being cold worked to increase the longitudinal length of the cast grid at least 2:1.

6. The positive grid as defined in claim 1 wherein the cold worked positive grid has a tensile strength of at least 9,000 psi after age hardening at room temperature after being cold worked.

7. The positive grid as defined in claim 1 wherein the grid is cold worked to reduce the thickness of the grid within 24 hours of the continuous casting of the grid.

8. The positive grid as defined in claim 1 which also comprises electro-chemically active paste applied to the reduced grid to at least substantially fill the interstices with the paste.

9. The positive grid as defined in claim 1 wherein the cold worked and reduced thickness positive grid has a thickness of not greater than about 0.022 of an inch.

10. The positive grid as defined in claim 1 wherein the cold worked and reduced thickness positive grid has a thickness of not greater than about 0.020 of an inch.

11. A negative grid for a negative plate of a lead-acid battery comprising a grid blank continuous cast of molten lead as part of a web and having a substantially uniform thickness and a plurality of interconnected wires with interstices between them, and the grid blank being cold worked to reduce the thickness of the as cast grid blank in the range of about 1.5:1 to 2.8:1 to provide a continuous cast negative grid having increased tensile strength after full age hardening at room temperature.

12. The negative grid as defined in claim 11 wherein the thickness of the as cast grid is reduced in the range of 2:1 to 2.5:1.

13. The negative grid as defined in claim 11 which also comprises the grid being cold worked to increase the longitudinal length of the cast grid at most 1.8:1.

14. The negative grid as defined in claim 11 wherein the cold worked negative grid has an ultimate tensile strength of at least 10,300 psi after full age hardening at room temperature after being cold worked.

15. The negative grid as defined in claim 11 wherein the grid is cold worked to reduce the thickness of the grid within 24 hours of the continuous casting of the grid.

16. The negative grid as defined in claim 11 which also comprises electro-chemically active paste applied to the reduced grid to at least substantially fill the interstices with the paste.

17. The negative grid as defined in claim 11 wherein the cold worked and reduced thickness negative grid has a thickness of not greater than about 0.022 of an inch.

18. The negative grid as defined in claim 11 wherein the cold worked and reduced thickness negative grid has a thickness of not greater than about 0.020 of an inch.

19. The negative grid as defined in claim 11 wherein the cold worked and reduced thickness negative grid has a thickness of about 0.010 of an inch.

20. A lead-acid battery comprising, a casing, a plurality of separate cells within said casing, each cell comprising a book of positive plates and negative plates, insulating separators disposed between adjacent plates of different polarity, an active paste applied to said plates, positive connectors joining each of said positive plates together and being connected to a positive battery terminal, and negative connectors joining each of said negative plates together and being connected to a negative battery terminal, said positive plates comprising a positive grid continuous cast of molten lead as part of a web and having a substantially uniform thickness and a plurality of interconnected wires with interstices between them, and the grid being cold worked to reduce the thickness of the grid as cast by at least 3:1 to provide a continuous cast positive grid having substantially increased corrosion resistance and increased ultimate tensile strength after full age hardening.

21. The lead-acid battery as defined in claim 20 wherein said cold worked and reduced thickness positive grid has a micro-structure with a substantially smaller grain size and a more uniform grain structure than that of the as cast continuous grid.

22. The lead-acid battery as defined in claim 20 wherein the thickness of said as cast positive grid is reduced in the range of 3.5:1 to 10:1.

23. The lead-acid battery as defined in claim 20 wherein the thickness of said as cast positive grid is reduced in the range 3.5:1 to 5:1.

24. The lead-acid battery as defined in claim 20 which also comprises said positive grid being cold worked to increase the longitudinal length of said as cast grid at least 2:1.

25. The lead-acid battery as defined in claim 20 wherein said cold worked positive grid has a tensile strength of at least 9,000 psi after full age hardening.

26. The lead-acid battery as defined in claim 20 wherein said positive grid is cold worked to reduce the thickness of the grid within 24 hours of the continuous casting of said grid.

27. The lead-acid battery as defined in claim 20 wherein the cold worked and reduced thickness positive grid has a thickness of not greater than about 0.022 of an inch.

28. A lead-acid battery comprising, a casing, a plurality of separate cells within said casing, each cell comprising a book of positive plates and negative plates, insulating separators disposed between adjacent plates of different polarity, an active paste applied to said plates, positive connectors joining each of said positive plates together and being connected to a positive battery terminal, and negative connectors joining each of said negative plates together and being connected to a negative battery terminal, said negative plates comprising a negative grid continuous cast of molten lead as part of a web and having a substantially uniform thickness and a plurality of interconnected wires with interstices between them and being cold worked to reduce the thickness of the as cast grid in the range of about 1.5:1 to 2.8:1 to provide a continuous cast negative grid having increased tensile strength after age hardening.

29. The lead-acid battery as defined in claim 28 wherein the thickness of said as cast negative grid is reduced in the range of 2:1 to 2.5:1.

30. The lead-acid battery as defined in claim 28 which also comprises said negative grid being cold worked to increase the longitudinal length of said as cast grid at least 1.1:1.

31. The lead-acid battery as defined in claim 28 wherein said cold worked negative grid has a tensile strength of at least 10,500 psi after full age hardening at room temperature.

32. The lead-acid battery as defined in claim 28 wherein said negative grid is cold worked to reduce the thickness of said grid within 24 hours of the continuous casting of said grid.

33. The lead-acid battery as defined in claim 28 wherein the cold worked and reduced thickness negative grid has a thickness of not greater than about 0.022 of an inch.

34. A lead-acid battery comprising, a casing, a plurality of separate cells within said casing, each cell comprising a book of positive plates and negative plates, insulating separators disposed between adjacent plates of different polarity, an active paste applied to said plates, positive connectors joining each of said positive plates together and being connected to a positive battery terminal, and negative connectors joining each of said negative plates together and being connected to a negative battery terminal, said positive plates comprising a positive grid continuous cast of molten lead as part of a web and having a substantially uniform thickness and a plurality of interconnected wires and interstices between them and being cold worked to reduce the thickness of said as cast grid by at least 3:1 to provide a continuous cast positive grid having substantially increased corrosion resistance and increased tensile strength after full age hardening, and said negative plates comprising a negative grid continuous cast of molten lead as part of a web and having a substantially uniform thickness and a plurality of interconnected wires with interstices between them and being cold worked to reduce the thickness of said as cast grid in the range of about 1.5:1 to 2.8:1 to provide a continuous cast negative grid having increased tensile strength after full age hardening.

35. The lead-acid battery as defined in claim 34 wherein the cold worked and reduced thickness positive and negative grids each have a thickness of not greater than about 0.022 of an inch.

* * * * *